March 10, 1959   J. J. PARKER ET AL   2,877,021

SPLINED WORK PIECE HOLDER

Filed May 16, 1957

INVENTORS
JOHN J. PARKER & LONDON T. MORAWSKI
BY
ATTORNEYS

United States Patent Office 2,877,021
Patented Mar. 10, 1959

2,877,021

SPLINED WORK PIECE HOLDER

John J. Parker and London T. Morawski, Detroit, Mich.

Application May 16, 1957, Serial No. 659,545

2 Claims. (Cl. 279—1)

This invention relates to chucks for holding splined work pieces. In our Patent 2,658,764, there is disclosed such a chuck in which those parts which have to be custom machined to suit a particular work piece design are provided in a sub-assembly which may be easily removed from the remainder of the chuck and replaced by a different sub-assembly suited for other work pieces. In the device there disclosed, the work piece is held by means of a rockable toothed member which is twisted out of alignment with a stationary toothed member so as to apply opposing torques through opposite side faces of the splined teeth in the work piece. The rockable member in this prior construction is positioned axially alongside the stationary work engaging teeth and where the dimensional tolerances allowed from piece to piece are not very small, there is the possibility of cocking of the work piece due to the unsymmetrical application of the chucking torque.

It is an object of the present invention to provide an improved chuck for holding splined work pieces wherein any tendency for the work piece to become cocked by the chucking torque is avoided.

Another object is to provide a chuck of this character which may be constructed as a sub-assembly suitable for use in devices of the type disclosed in the aforementioned patent.

Further objects and advantages of the present invention will be apparent from the following description, reference being had to the accompanying drawing wherein a preferred form of the present invention is illustrated.

Figure 1:
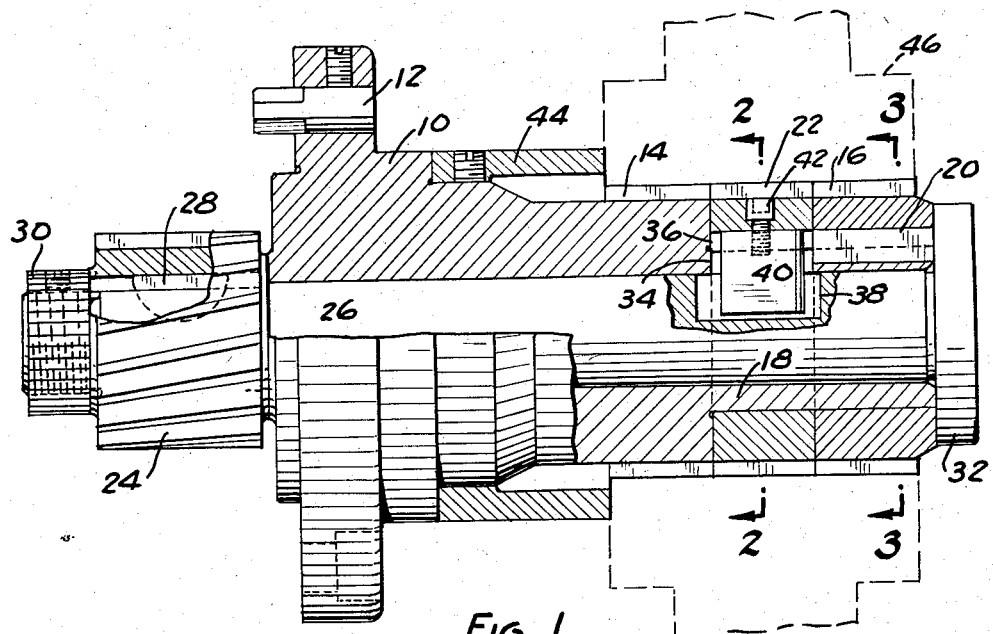
Fig. 1 is a longitudinal cross section of a splined work piece holder ambodying a preferred form of the present invention.

In the device disclosed in the drawings, a chuck body 10 is conformed on its left hand end to be positioned upon a main body, not shown, by a dowel pin 12. The body 10 may be similar in this respect to the body 32 in our prior patent heretofore identified. Formed on the body 10 is a first work engaging toothed member 14 which may be integral therewith. A second work engaging toothed member 16 is also formed on the body 10 and spaced axially from the member 14 a predetermined distance. The member 16 is carried upon a tubular support 18 which also is formed integrally with the body 10. A key 20 serves to prevent rotation of the member 16.

Mounted between the stationary toothed members 14 and 16 is a rockable work engaging toothed member 22 which is journalled upon the tubular support 18. A rockable actuating member comprises a helical pinion 24 secured to a shaft 26 by a key 28 and a nut 30. At its right hand end the shaft 26 has an integral flange 32.

Figure 2:
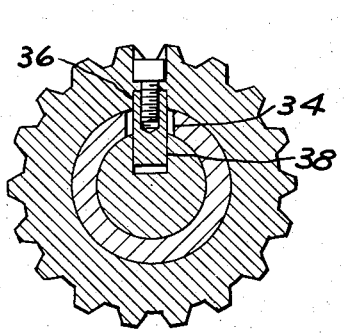
Fig. 2 is a cross section taken on line 2—2 of Fig. 1.
Figure 3:
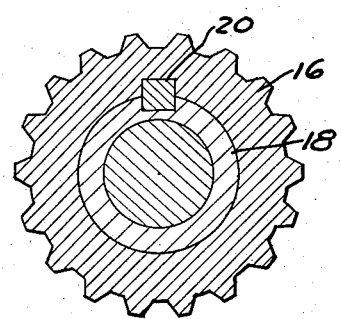
Fig. 3 is a cross section taken on line 3—3 of Fig. 1.

The tubular support 18 has a radial aperture 34 in its side wall and intermediate the two stationary toothed members. A keyway 36 in the member 22 and a keyway 38 in the shaft 26 are in alignment with the aperture 34. A radially extending driving key 40 is mounted in these two keyways and is retained by a screw 42 in the rockable member 22. The aperture 34 has circumferential clearance between its sides and the key 40 as shown in Fig. 2. A work engaging stop sleeve 44 may be mounted upon the body to assist in locating work pieces on the chuck.

In operation, with the body 10 assembled to a chuck actuating assembly such as that shown in our prior patent, and with the operating rod in released position, the three toothed elements 14, 16, and 22 will have their teeth in alignment and a work piece may be removed from or placed upon these teeth. With a work piece in position on the chuck as shown at 46, the operating rod is then shifted to engaging position which causes rotation of the rockable driving member 24—26. The driving key 40 thus rocks the work engaging toothed member 22, placing a chucking torque upon the teeth of the work piece to tightly hold the same for a machining operation.

It will be seen that the torque applied to the work piece by the rockable member 22 and the counter torque applied by the stationary members 14 and 16 is applied symmetrically so far as the axial length of the work piece 46 is concerned.

Thus, there is no tendency for a work piece to become cocked upon the chuck axis. When the work piece has been machined, the operating rod is again released permitting it to be removed from the chuck.

It will thus be seen that the present invention provides an improved holder for splined work pieces in which torque is applied through the splined teeth in a manner which is symmetrical not only around the circumference but also in an axial aspect as well.

While the form of embodiment of the invention as herein disclosed constitutes a preferred form, it is to be understood that other forms might be adopted, all coming within the scope of the claims which follow.

What is claimed is as follows:

1. A chuck for holding splined work pieces comprising a body member having means at one end thereof for mounting the body member on a chuck adapter and having at its opposite end a tubular extension of lesser diameter, said tubular extension defining, in part, a bore that extends axially through the body member to said first mentioned end thereof, a shaft extending axially through said bore, means fixed on one end of the shaft for rotating the shaft, said body having a first work engaging member fixed thereon, a second work engaging member fixed on said tubular extension and spaced axially from said first work engaging member, said two work engaging members having axially aligned teeth thereon, a third toothed work engaging member rotatably supported on said tubular extension between said first and second work engaging members, said shaft and said work engaging member fixed on said tubular extension having aligned, radially extending sockets therein, said tubular extension having a radially extending aperture therethrough aligned with the radially extending sockets, a key having a relatively close fit in one of said sockets, said key extending radially through the aperture in said tubular extension and into the other socket with a close fit, said opening in said tubular extension having a greater circumferential extent than said key whereby when the shaft is rotated in opposite directions by said means at said one end of the shaft, the teeth on said third work engaging member are rocked into and out of alignment with the teeth on the other two work engaging members and the third work engaging member is permitted to rotate relative to the other two through an arc determined by the clearance between said key in the opposite ends of said aperture in said tubular extension.

2. The combination called for in claim 1 wherein said means at said one end of the shaft comprises a helically splined member.

References Cited in the file of this patent

UNITED STATES PATENTS

| | | |
|---|---|---|
| 2,658,764 | Parker et al. | Nov. 10, 1953 |
| 2,665,136 | Fallon | Jan. 5, 1954 |
| 2,762,629 | Dalby | Sept. 11, 1956 |
| 2,805,864 | Parker | Sept. 10, 1957 |